US00RE51048E

(19) United States
(12) Reissued Patent
Barnett et al.

(10) Patent Number: US RE51,048 E
(45) **Date of Reissued Patent: *Sep. 29, 2026**

(54) EXTENDING SOCKET FOR PORTABLE MEDIA PLAYER

(71) Applicant: PopSockets LLC, Boulder, CO (US)

(72) Inventors: David B. Barnett, Boulder, CO (US); Lawrence E. Carlson, Boulder, CO (US)

(73) Assignee: POPSOCKETS LLC, Boulder, CO (US)

( * ) Notice: This patent is subject to a terminal disclaimer.

(21) Appl. No.: 18/229,614

(22) Filed: Aug. 2, 2023

Related U.S. Patent Documents

Reissue of:
(64) Patent No.: 8,560,031
Issued: Oct. 15, 2013
Appl. No.: 13/403,729
Filed: Feb. 23, 2012

U.S. Applications:
(63) Continuation of application No. 17/105,794, filed on Nov. 27, 2020, now Pat. No. Re. 49,702, which is an application for the reissue of Pat. No. 8,560,031.

(60) Provisional application No. 61/453,375, filed on Mar. 16, 2011.

(51) Int. Cl.

| | |
|---|---|
| ***F16M 11/40*** | (2006.01) |
| ***A45F 5/10*** | (2006.01) |
| ***F16M 11/10*** | (2006.01) |
| ***F16M 13/00*** | (2006.01) |

(Continued)

(52) U.S. Cl.
CPC ..... *F16M 11/40* (2013.01); *A45F 5/10* (2013.01); *F16M 11/105* (2013.01); *F16M 13/00* (2013.01); *F16N 11/10* (2013.01); *G06F 1/1626* (2013.01); *A45C 2200/15* (2013.01); *G06F 2200/1633* (2013.01)

(58) Field of Classification Search
CPC ..... F16M 11/10; F16M 11/105; F16M 13/00; A45F 5/10; G06F 1/1626
See application file for complete search history.

(56) References Cited

U.S. PATENT DOCUMENTS 4,927,191 A 5/1990 Miko
4,955,493 A 9/1990 Touzani
(Continued)

FOREIGN PATENT DOCUMENTS

GB 2316263 A 2/1998

*Primary Examiner* — C. Michelle Tarae
(74) *Attorney, Agent, or Firm* — Irell & Manella LLP

(57) ABSTRACT

Extending sockets, formed of accordions generally with buttons attached at their distal ends, for attaching to portable media players or portable media player cases. Cases having attached sockets serve purposes beyond protection of the player, such as managing a headset, attaching to belts or the like, forming stand legs to prop the player at a desired angle, forming grips for gaming, forming a grip for securely holding and manipulating player with one hand, and forming extended legs for wedging players that are phones between the ear and shoulder. The sockets are structured to allow headset cords to be wound around the accordions when the sockets are extended, to prevent the cords from tangling. Space in an attached case may be provided so that the sockets may be partially or fully retracted with headphone cords wrapped around them to save space.

14 Claims, 9 Drawing Sheets

(51) Int. Cl.
*F16N 11/10* (2006.01)
*G06F 1/16* (2006.01)

(56) References Cited

U.S. PATENT DOCUMENTS

| | | | | |
|---|---|---|---|---|
| 5,568,549 | A * | 10/1996 | Wang | F16M 11/40 379/426 |
| 6,196,850 | B1 | 3/2001 | Dietz et al. | |
| D471,547 | S | 3/2003 | Ruohonen | |
| 6,776,660 | B1 | 8/2004 | Kubota et al. | |
| 6,781,522 | B2 | 8/2004 | Sleva et al. | |
| D532,004 | S | 11/2006 | Kettula et al. | |
| 7,180,451 | B2 | 2/2007 | Silzer | |
| 7,324,156 | B2 | 1/2008 | Lohr et al. | |
| 7,337,933 | B1 | 3/2008 | Klinberg | |
| D570,593 | S | 6/2008 | Justiss | |
| 7,422,486 | B2 | 9/2008 | Hoff et al. | |
| 7,532,910 | B2 | 5/2009 | Chen | |
| 7,540,788 | B2 | 6/2009 | Murphy et al. | |
| 7,581,119 | B2 | 8/2009 | Tupman et al. | |
| 7,644,895 | B2 | 1/2010 | Tseng | |
| 7,678,271 | B2 | 3/2010 | Curtin | |
| 7,782,610 | B2 | 8/2010 | Diebel et al. | |
| 7,983,034 | B1 | 7/2011 | Mohoney | |
| D647,085 | S | 10/2011 | Chung et al. | |
| 8,078,224 | B2 | 12/2011 | Fadell et al. | |
| 8,080,975 | B2 | 12/2011 | Bessa et al. | |
| 8,186,642 | B2 * | 5/2012 | Weiss-Vons | F16B 47/00 248/205.8 |
| 8,284,980 | B2 * | 10/2012 | Parker | H04R 1/1033 381/384 |
| 8,844,098 | B2 * | 9/2014 | Karmatz | B25G 1/102 16/422 |
| 2002/0069582 | A1 * | 6/2002 | Weder | A01G 9/026 47/72 |
| 2005/0243522 | A1 | 11/2005 | Nilsen et al. | |
| 2007/0093786 | A1 | 4/2007 | Goldsmith et al. | |
| 2007/0164036 | A1 * | 7/2007 | Brandenburg | 220/676 |
| 2008/0053770 | A1 | 3/2008 | Tynyk | |
| 2008/0090443 | A1 | 4/2008 | Ackloo | |
| 2008/0123287 | A1 | 5/2008 | Rossell et al. | |
| 2008/0146958 | A1 | 6/2008 | Guillory et al. | |
| 2008/0221404 | A1 | 9/2008 | Tso | |
| 2008/0273297 | A1 | 11/2008 | Kumar | |
| 2009/0115367 | A1 | 5/2009 | Kidakam | |
| 2009/0240297 | A1 | 9/2009 | Shavit et al. | |
| 2010/0155550 | A1 * | 6/2010 | Weiss-Vons | F16B 47/00 248/363 |
| 2011/0015496 | A1 | 1/2011 | Sherman et al. | |
| 2011/0036876 | A1 | 2/2011 | Fathollahi | |
| 2011/0084081 | A1 * | 4/2011 | Chung et al. | 220/628 |
| 2011/0117974 | A1 | 5/2011 | Spitalnik | |
| 2011/0252839 | A1 | 10/2011 | Stevens | |
| 2011/0301439 | A1 | 12/2011 | Albert et al. | |
| 2012/0042476 | A1 | 2/2012 | Karmatz | |

* cited by examiner

EXTENDING SOCKET FOR PORTABLE MEDIA PLAYER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application claims benefit under 35 U.S.C. § 120 as a continuation of U.S. patent application No. 17/105,794, filed Nov. 11, 2020, now RE49,702, which is an application for reissue of U.S. Pat. No. 8,560,031. Each of the aforementioned patent and applications claims the benefit of U.S. provisional patent application No. 61/453,375, filed Mar. 16, 2011.*

BACKGROUND OF THE INVENTION

1. Field of the Invention

The present invention relates to extending sockets for portable media players. In particular, embodiments of the one or more present inventions relate to portable media cases including one or more socket extensions.

2. Discussion of Related Art

Portable media players such as MP3 players and smart phones are often housed in protective covers or cases in order to protect the media player from scratching or damage from dropping. Such cases increase the effective size of the media player and typically serve no purpose beyond protection.

Some portable media player cases include an extra feature to enable a single further function beyond protection. For instance, some cases have an arm that extends for standing the case on its side; one has an arm that extends for headset management; some have a pocket for storing headsets; some have two humps to function as gaming grips; one has two extendable flaps with finger holes to be used as gaming grips; and some have a clip for mounting the player on a belt. However, there is no case that serves all of these functions, and there is no case that serves the mounting functions without adding significant effective size to the player.

A need remains in the art for portable media player cases and extending sockets that perform a multitude of functions, such as the aforementioned functions, without adding significantly to the effective size of the player.

SUMMARY OF THE INVENTION

One or more embodiments of the one or more present inventions are directed to portable media player cases that include extending sockets for serving other purposes beyond protection of the player itself, such as one or more of storing headphone cords and preventing the cords from tangling, forming stand legs, forming gaming grips, clipping to belts, waistbands and shirt pockets, forming legs for wedging players that are phones between the shoulder and ear, and forming a grip that allows a user to securely hold and manipulate the player with one hand. Such cases include sockets extendable outward from the case. The sockets generally include extending elements, called "accordions," comprising cylindrical or conical membranes with flexural hinges having feet at their distal ends. The sockets are structured to allow headphone cords to be wound around the accordions when the sockets are extended, to prevent the cords from tangling. Cavities in the case are provided so that the sockets may collapse flush with the case and may be partially or fully retracted with headphone cords wrapped around them in order to save space. Buttons may attach at the distal ends of the socket and in at least one embodiment are rigid, and in at least one embodiment extend radially past the distal end of the sockets to secure cords and the like.

In at least one embodiment, the sockets further act as stand legs for propping the player in various tilted or upright positions for viewing, data entry, video conferencing, etc. In their expanded states, the sockets act as comfortable grips for gaming, data entry, and searching the Internet. In at least one embodiment, the sockets act as a belt mount: two sockets can collapse onto a belt between them, thereby securing the belt between the sockets and the back of the case. The sockets in their expanded state facilitate hands-free talking on phone players, allowing user to comfortably wedge the player between the ear and shoulder. A socket in its expanded state facilitates one-hand control of the player by allowing the user to wedge fingers between the socket and the back of the case, while manipulating the front of the player with the thumb of the same hand.

The extending elements may comprise accordions, including flexural hinges interspersed with walls. The accordion structures allow the buttons to extend not just straight outward from the case, but also to curve away from the outward axis at various oblique angles. The buttons may snap onto the ends of the accordions, be glued on, or be feet integrally formed with the accordions. In particular, in at least one embodiment the accordions form cones having rotating "flipper" walls as well as fixed walls that jointly result in the walls folding down next to one another (such that the walls are generally parallel to the axis of the accordion) rather than stacking on top of one another.

A socket maintains full functionality without the buttons, and its feet may further form suction cups for attaching the player temporarily to flat surfaces. A socket may be attached to the case or directly to a portable media player. It may be attached permanently or temporarily, for instance by snap-fit or suction cup, and it may be integrally formed with the case. The buttons' purpose includes, but is not limited to, decoration. Designs can be added to the surface of the buttons. The buttons may also take on different forms to play different roles, such as mounting jacks for players that function as cameras or suction cups to attach to a surface.

In one embodiment, the case comprises an outer body, covering the edges and part of the back of the player, formed of a soft, flexible material such as thermoplastic urethane; an inner body or "socket-board", covering the inner region of the back of the player, formed of a hard plastic, such as polycarbonate, integrally formed with the outer body; two accordions, formed of flexible material, for example a polyester-based thermoplastic polyurethane elastomer such as Skythane® S190A, snap-fit to the socket-board; and two buttons, formed of hard plastic, such as polycarbonate, glued to the accordions. The case forms an opening for the portable media player screen in the front, with two socket extensions in the back.

Other embodiments include variations in (i) part material; (ii) number of socket extensions; (iii) location of socket extensions; (iv) mode of attachment of button to accordion; (v) mode of attachment of accordion to case body or portable media player; (vi) presence or absence of: button, case body, and socket-board; (vii) number of case body parts; and (viii) presence or absence of a component for connecting sockets extensions to the electronic components of the player to enable further functionality such as speakers.

BRIEF DESCRIPTION OF THE DRAWINGS

FIG. 1 comprises FIG. 1A, 1B, 1C, 1D, and 1E.

FIG. 3 comprises FIGS. 3A and 3B.

FIG. 4 comprises FIGS. 4A and 4B.

FIG. 10 comprises FIGS. 10A and 10B.

FIG. 11 comprises FIGS. 11A and 11B.

FIG. 12 comprises FIGS. 12A and 12B.

DETAILED DESCRIPTION OF THE INVENTION

The following table lists elements of the illustrated embodiments of the invention and their associated reference numbers for convenience.

| Ref. No. | Element |
|---|---|
| 1. | Button |
| 2. | Accordion |
| 3. | Socket-board |
| 4. | Outer case body |
| 5. | Vertical button wall |
| 6. | Button ring |
| 7. | Accordion vent |
| 8. | Accordion top vertical wall |
| 9. | Accordion flexural hinge |
| 10. | Accordion flipper wall |
| 11. | Accordion middle vertical wall |
| 12. | Accordion bottom vertical wall |
| 13. | Accordion male snap-fit |
| 14. | Socket-board flange |
| 15. | Socket-board socket cavity |
| 16. | Socket-board female snap-fit |
| 17. | Case body camera hole |
| 18. | Case body power button hole |
| 19. | Case body lip |
| 20. | Case body speaker hole |
| 21. | Case body port hole |
| 22 | Case ringer hole |
| 23. | Case volume button |
| 24. | Socket (comprises 1 and 2) |
| 25. | Headphone jack hole |
| 26. | Headphone jack (not part of invention) |
| 27. | Headphone cord (not part of invention) |
| 28. | Belt (not part of invention) |
| 29. | Folding portion of accordion |
| 30. | Socket-board camera and flash bole |
| 31. | Suction-cup |
| 32. | Suction-cup tape platform |
| 33. | Suction-cup tape |
| 34. | Suction-cup female snap-fit |
| 35 | Suction-cup tape platform female snap-fit |
| 100. | Portable media player case constructed to attach a socket |
| 101. | Portable media player case not constructed to attach a socket (not part of invention) |
| 200. | Media player (not part of invention) |

Figure 1B:
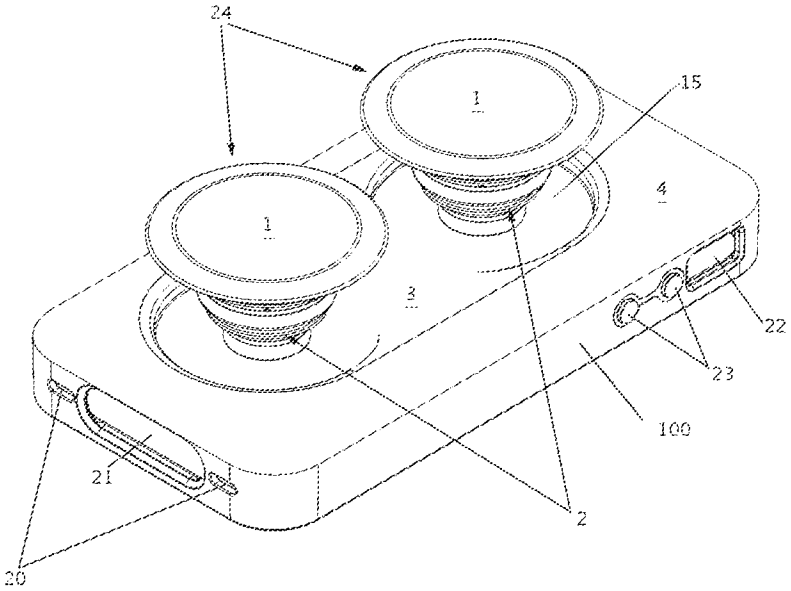
FIG. 1B is an isometric back view of the portable media player case of FIG. 1A with its sockets opened, or extended.
Figure 1A:
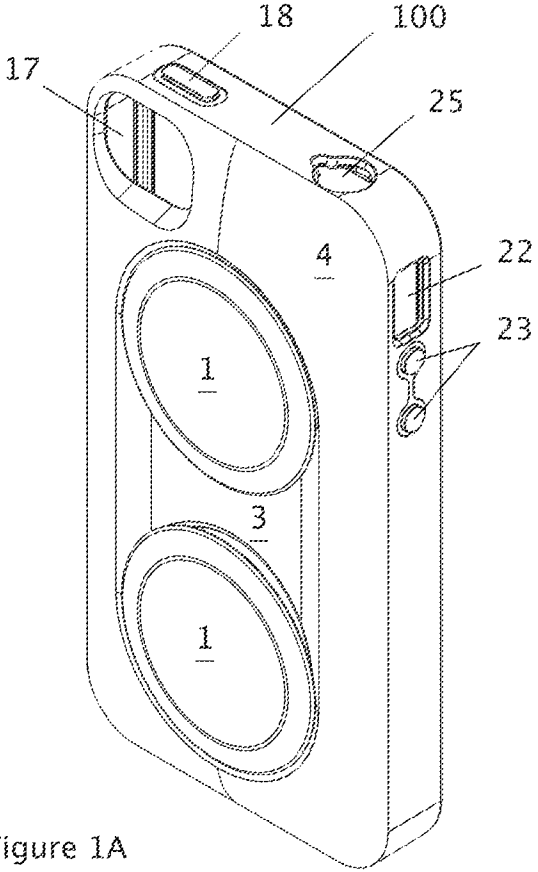
FIG. 1A is an isometric back view of a portable media player case according to at least one embodiment of the one or more present inventions, wherein the sockets retracted, or collapsed.

FIG. 1 comprises FIGS. 1A, 1B, 1C, 1D, and 1E. FIG. 1A is an isometric back view drawing of a portable media player case 100 according to the present invention with the accordions 2 of its sockets 24 retracted, or collapsed. FIG. 1B is an isometric back view of portable media player case 100 with its accordions 2 opened, or extended.

Case 100 comprises outer case body 4, including socket-board 3, and sockets 24. Each socket 24 generally comprises a collapsible accordion 2 attached to case 100 such that it collapses to nestle within cavity 15, and a button 1 attached to the distal end of accordion 2. Button 1 may comprise a separate attached element or may be integral with accordion 2.

FIG. 1A shows case 100 in a collapsed configuration. In a preferred embodiment, each socket 24 fits within its cavity 15 (shown in FIG. 1B) such that the outer surface of button 1 is essentially flush with the back of the case body, and the circumference of button 1 fills cavity 15 leaving little gap between button 1 and the back of case body 4. The advantage of this embodiment is that the back of case 100 forms a fairly smooth surface that does not catch on other items or collect detritus. Thus, the case is very similar to conventional portable media player cases in this configuration. Case 100 may be unitary or constructed as shown in FIGS. 2-5, described below.

Like conventional cases, case 100 generally includes openings forming ports applicable to the media player, for example speaker holes 20, port hole 21, ringer hole 22, volume buttons 23, and headphone jack hole 25.

FIG. 1B shows case 100 with accordions 2 of sockets 24 extended. The user pulls buttons 1 out from case body 4, and accordions 2 unfold and extend outward. Preferably, accordions 2 are stable in their extended position so they stay open until buttons 1 are pressed and sockets 24 close again. The advantages of extendable sockets 24 are described below in detail, and include allowing headphone cord storage and forming adjustable stands for the media player.

Figure 1E:
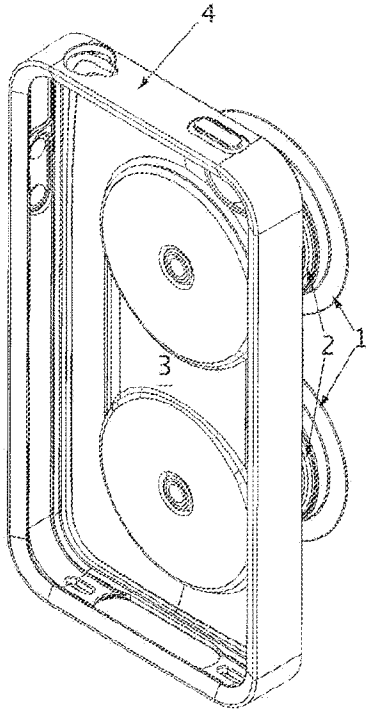
FIG. 1E is an isometric front view of the portable media player case of FIG. 1A, with the smart phone removed.
Figure 1D:
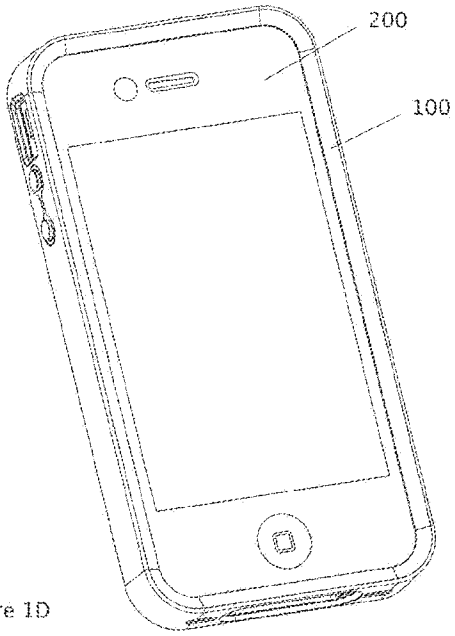
FIG. 1D is an isometric front view of the portable media player case of FIG. 1A, with a smart phone disposed within the case.
Figure 1C:
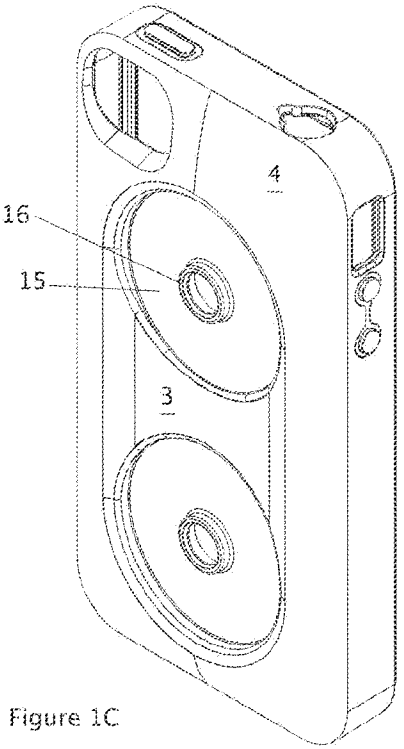
FIG. 1C is an isometric back view of the portable media player case of FIG. 1A, with its sockets removed.

FIG. 1C is an isometric back view of portable media player case 100, with its sockets 24 removed. This allows an unobstructed view of the back of case 100. In this embodiment, the back of case 100 is formed of an attached socket-board 3, forming socket cavities 15 having female snap-fit portions 16 for attaching accordions 2. FIG. 1D is an isometric front view of portable media case 100, with a media player 200 (such as an iPhone™ smart phone) disposed within the case. FIG. 1E is an isometric front view of portable media case 100, with media player 200 removed. Case 100 is sized to fit media player 200. For example, in the case where media player 200 comprises an iPhone™, it might be about 118 mm tall by 62 mm wide by 16 mm thick. Buttons 1 might be around 40 mm in diameter 4 mm thick, and accordions 2 might extend outward about 22 mm.

Figure 2:
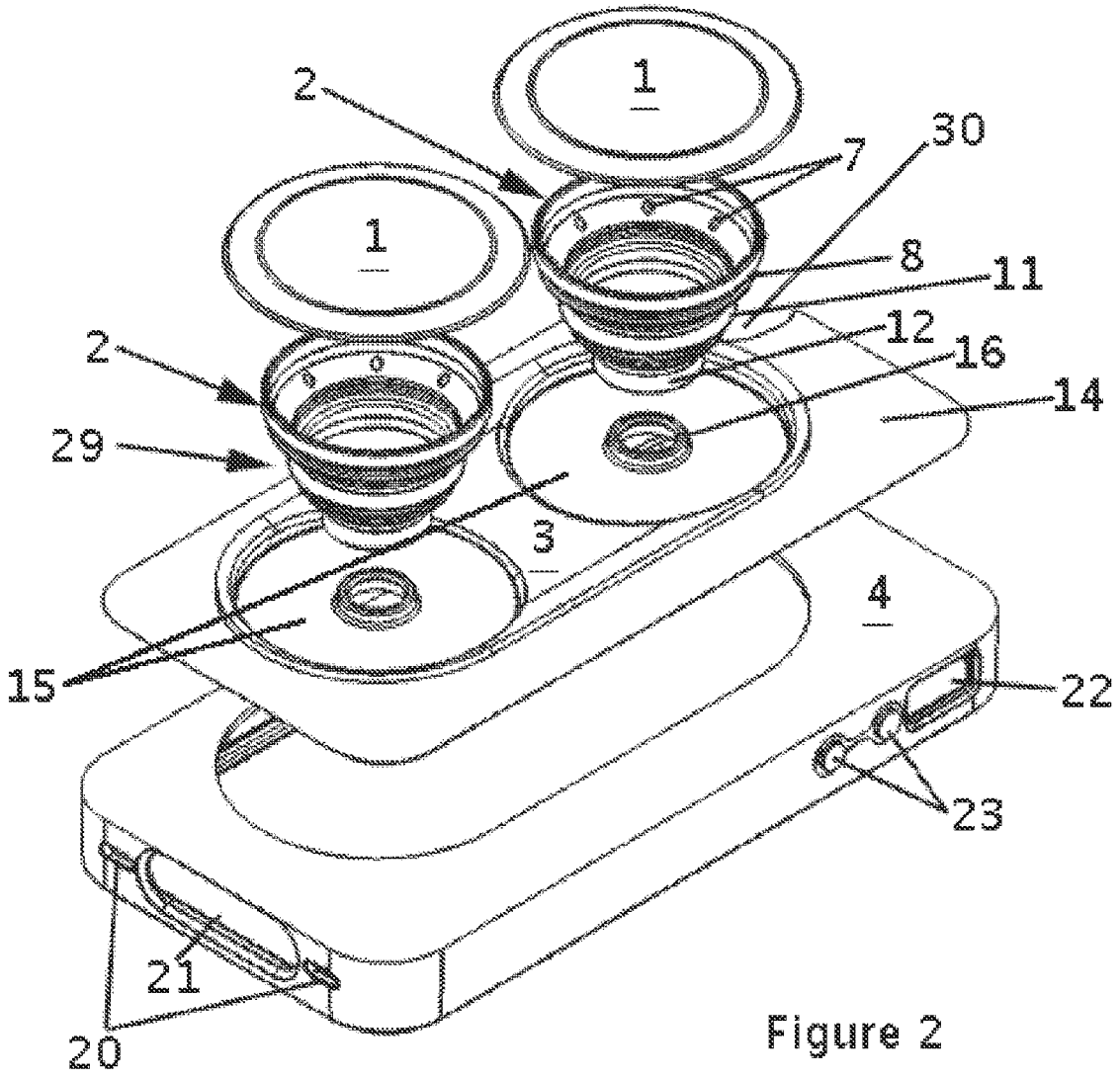
FIG. 2 is an isometric exploded back view of the portable media player case of FIG. 1.
Figure 3A:
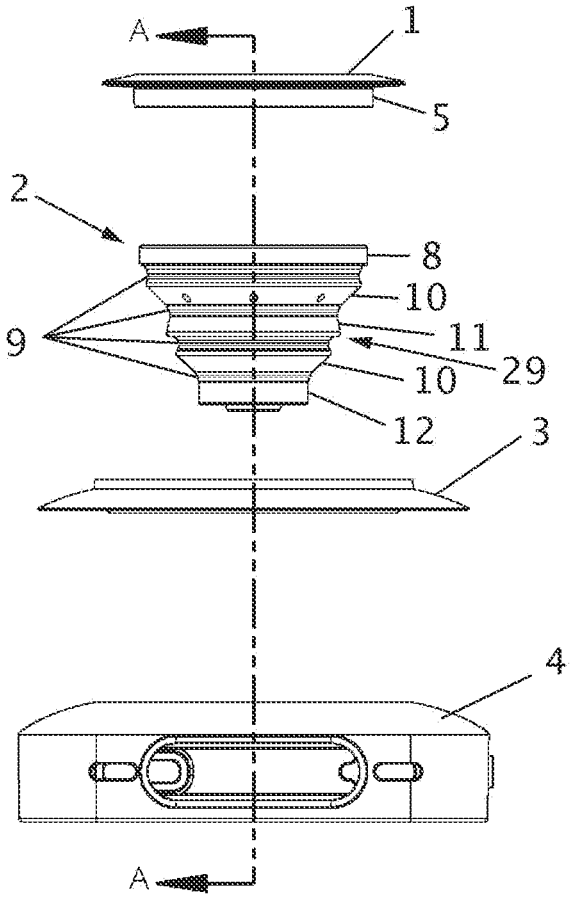
FIG. 3A is an exploded end view of the media case of FIG. 1.
Figure 3B:
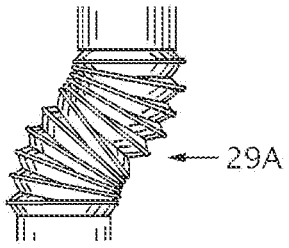
FIG. 3B is a side view of an alternative folding section.
Figure 4A:
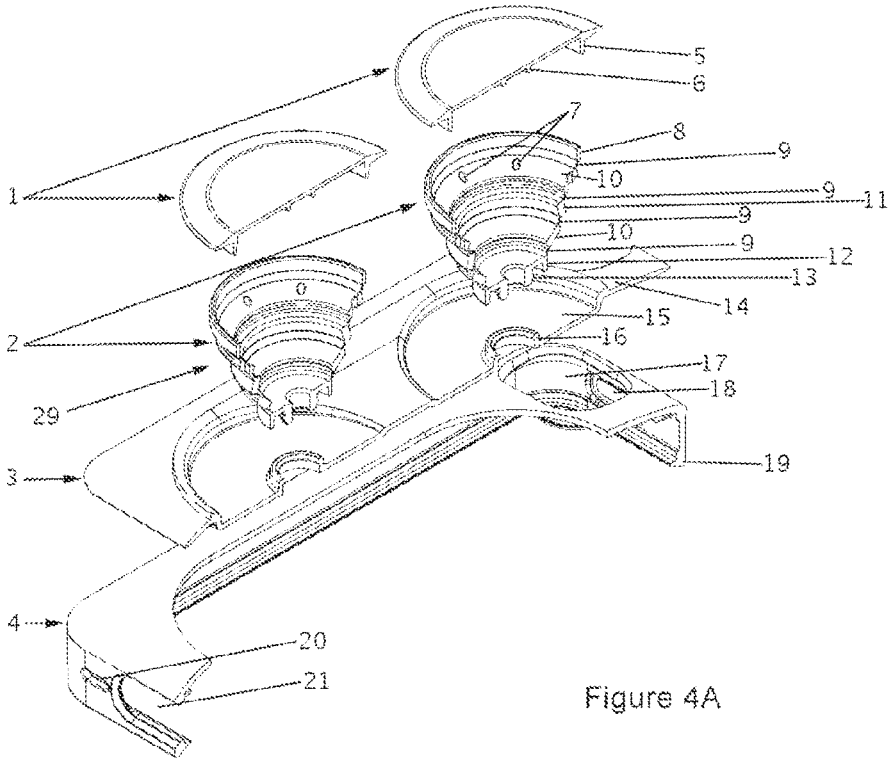
FIG. 4A is a cutaway, isometric, exploded, side view of the portable media player case of FIG. 1, sectioned along the line A-A indicated in FIG. 3A.
Figure 4B:
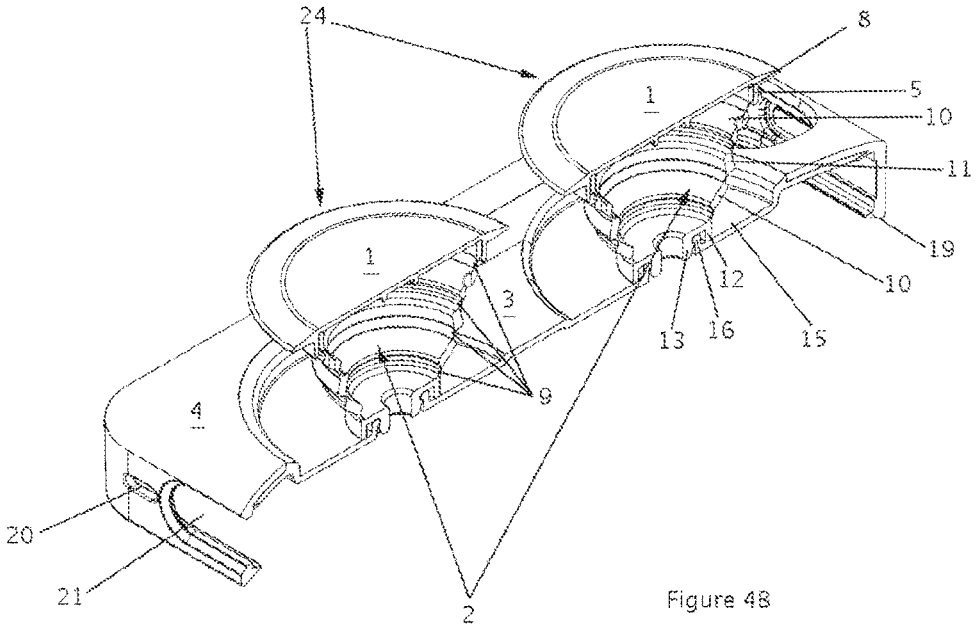
FIG. 4B is a cutaway isometric side view of the portable media player case of FIG. 1.
Figure 5:
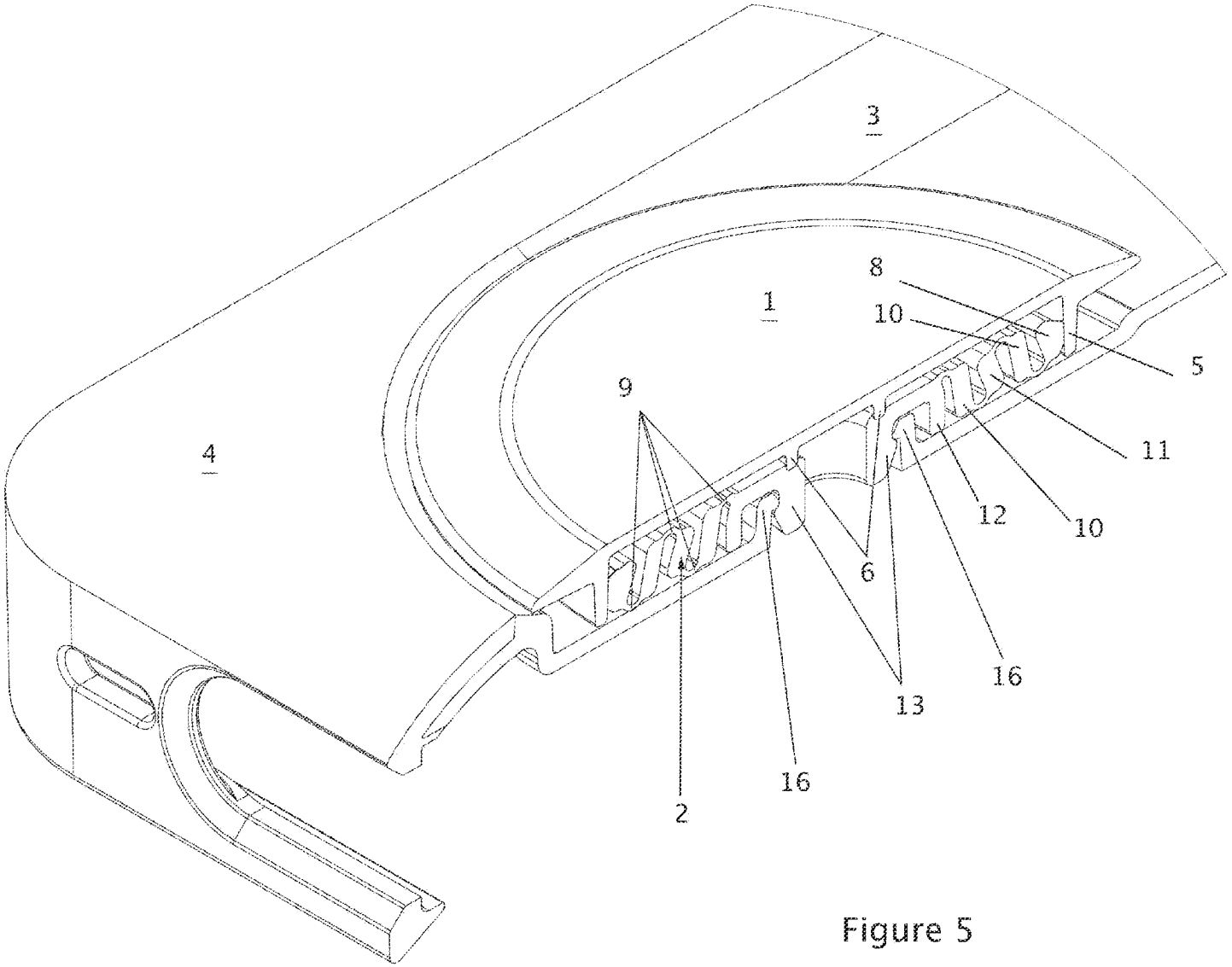
FIG. 5 is a detailed cutaway isometric side view of a portion of the portable media player case of FIG. 1 sectioned along the line A-A indicated in FIG. 3A.

FIGS. 2-5 show examples of the construction and operation of the case with the sockets. FIGS. 2, 3 and 4A show exploded views of case 100, and FIGS. 4B and 5 show cutaway views, sectioned along line A-A indicated in FIG. 3A, illustrating the operation of the sockets 24.

FIG. 2 is an isometric exploded back view of one embodiment of portable media case 100. In this embodiment, the back surface of outer case body 4 comprises a socket-board 3 including a socket-board flange 14 over-molded onto outer case body 4 and forming socket-board cavities 15 which have female snap-fit portions 16. Sockets 24 comprise accordions 2 and buttons 1. Each accordion 2 includes a male snap-fit portion 13 for attachment to socket-board female snap-fit 16 (better shown in FIGS. 4 and 5). In a preferred embodiment, each accordion is structured with accordion vents 7 to allow for air movement during expansion and contraction, and a folding section 29 comprising walls and hinges (better shown in FIGS. 4 and 5). As an alternative, folding section 29 could be configured similarly to the bendable portion of a bendable straw or Slinky® Pop Toob as shown in FIG. 3B. (see for example U.S. Pat. Nos. 2,094,268 and 4,846,510, incorporated herein by reference).

In a preferred embodiment, case body 4 is formed of TPU or TPE. Socket-board 3 is formed of PC or ABS, as are buttons 1. Accordions 2 are formed of Skythane® S190A or low-density polypropylene.

FIG. 3 comprises FIGS. 3A and 3B. FIG. 3A is an exploded end view illustrating the structure of a preferred embodiment of accordion 2 in detail. Each accordion 2 includes a folding section 29 comprising a series of relatively rigid walls 10, 11, 12 interspersed with flexural (or "living") hinges 9, which flex as accordion 2 is collapsed or expanded. Accordion 2 further comprises top vertical wall 8 (for connection to button 1) and bottom vertical wall 12.

FIG. 3B shows an alternative folding section 29A of accordion 2. In these examples, folding sections 29A comprises flexible membranes including hinges. In the embodiment of FIG. 3A, accordion 2 forms a cone. This allows walls 8, 10, 11, 12 to fold next to one another (as shown in FIG. 5) rather than stacking on top of one another as is the case with the embodiment of FIG. 3B. Both embodiments 29 and 29A are stable in various extended configurations.

FIG. 4A is an isometric exploded side view of the portable media case of FIG. 1, sectioned along the line indicated in FIG. 3A. FIG. 4B is a sectioned isometric side view of the portable media case of FIG. 1, after fabrication. Sockets 24 are extended outward. As an example, vertical button wall 5 is glued to accordion top vertical wall 8. Accordion male snap-fit 13 engages with socket-board female snap-fit element 16. Other embodiments might have button 1 formed integrally with, or snap-fitted to, accordion 2, or have accordion 2 permanently affixed to socket-board 3.

FIG. 5 is a detailed sectioned isometric side view of a portion of the portable media player case of FIG. 1, sectioned along the line A-A indicated in FIG. 3A. Socket 24 is in its collapsed position. Note that flexing of hinges 9 allows walls 10 and 11 to fold up in a generally parallel configuration next to one another, rather than stacking on top of one another. Walls 10 are designated as flipper walls, because they are oriented diagonally upward when accordions 2 are extended and diagonally downward when accordions 2 are closed. Walls 8, 11, and 12 remain oriented vertically in both configurations, and do not rotate. Wall 5 is rigid and does not rotate. Note that the terms "upward" and "downward" are used for convenience in describing the drawings, but are specifically intended to include the case in various other orientations.

In one embodiment, accordion 2 is a cone formed of Skythane® S190A. Walls 8, 10, 11, 12 are all about 1 to 2 mm thick and 2 to 5 mm long. Flexural hinges 9 are about 0.2 to 0.4 mm thick and 1 to 2 mm long. Flipper walls are about 20-40 degrees off vertical when accordion 2 is in an expanded state. This allows walls 8, 10, 11, 12 to fold next to one another in a generally parallel configuration as show in FIG. 5, reducing the profile of socket 24 in its collapsed configuration.

Button ring 6 presses into accordion male snap-fit 13, in order to urge it to engage with socket-board female snap-fit 16.

Figure 6:
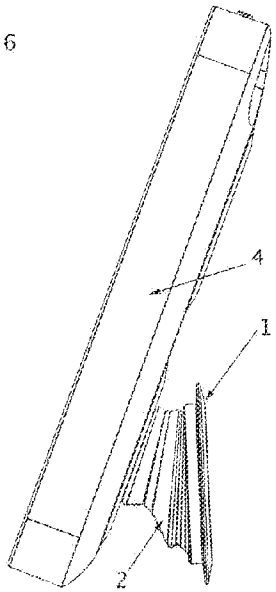
FIG. 6 is a side view of the portable media case of FIG. 1 propped upright by extending the lower of the two sockets at an oblique angle to the case.
Figure 7:
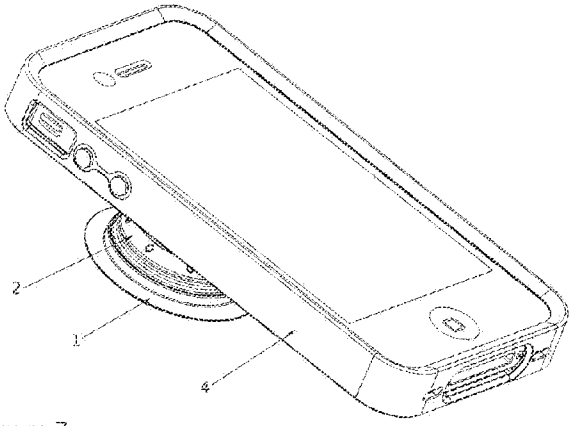
FIG. 7 is an isometric side view of the portable media player case of FIG. 1 tilted by extending the upper of the two sockets.
Figure 8:
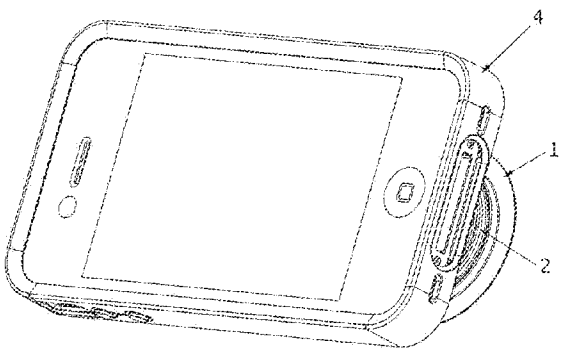
FIG. 8 is an isometric side view of the portable media player case of FIG. 1 disposed sideways and tilted by extending the two sockets.

FIG. 6 is a side view of portable media case 100 propped upright (called the video conference mode) by extending the lower of the two sockets 24 at an oblique angle to outer case body 4. FIG. 7 is an isometric side view of case 100 slightly tilted (called the text mode) by extending the upper of the two sockets. FIG. 8 is an isometric side view of the case 100 disposed sideways and tilted (called the theater mode) by extending the two sockets 24, either straight out for a steeper angle, or obliquely for a shallower angle.

Figure 9:
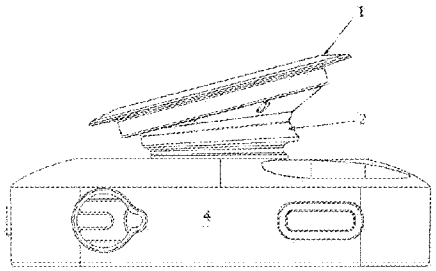
FIG. 9 is a side view of the portable media player case with both sockets partially extended at an oblique angle, to allow for a shallow horizontal stand by resting case on faces of buttons or a steep horizontal stand by resting case on edges of buttons extended farthest from case.

FIG. 9 is a side view of the portable media case configured in the theater mode similar to FIG. 8, with sockets 24 extended obliquely. When resting on the faces of the buttons in this configuration, portable media case is in what is called surfing mode, well suited for browsing the Internet.

Figure 10B:
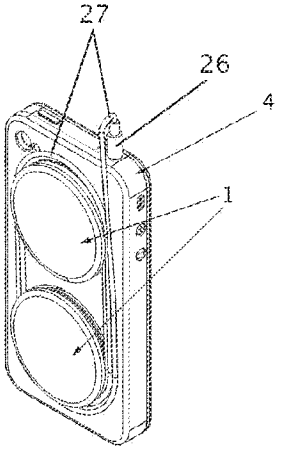
FIG. 10B is a back isometric view of a portable media player case according to an embodiment of the present invention with the sockets partially retracted and a headphone cord wrapped around the accordions.
Figure 10A:
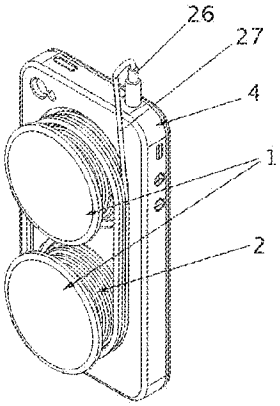
FIG. 10A is a back isometric view of a portable media player case according to an embodiment of the present invention with the sockets extended and a headphone cord wrapped around the accordions.

FIG. 10 comprises FIGS. 10A and 10B, and shows case 100 used to retain a headset cord 27 without tangling. FIG. 10A is a back isometric view of case 100 with the sockets extended. The user has inserted a headset jack 26 into media player 200 via headset jack hole 25, and has wound headphone cord 27 around accordions 2. FIG. 10B is similar to FIG. 10A, except that sockets 24 have been mostly retracted. This retains cord 27, reduces the thickness of case 100, and lowers the chance of catching buttons 1 on other objects. It is helpful for buttons 1 to extend radially past accordions 2 so that buttons 1 form a lip for retaining cord 27 (or a belt 28 as shown in FIG. 11).

Figure 11B:
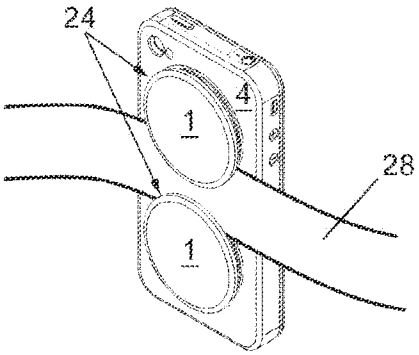
FIG. 11B is a back isometric view of a portable media player case according to an embodiment of the present invention with the sockets almost completely retracted and a belt inserted between the sockets.
Figure 11A:
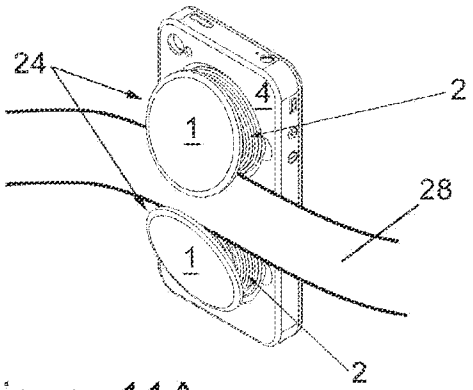
FIG. 11A is a back isometric view of a portable media player case according to an embodiment of the present invention with the sockets extended in oblique configurations and a belt inserted between the sockets.

FIG. 11 comprises FIGS. 11A and 11B, and shows sockets 24 gripping a belt 28, in order to retain case 100. FIG. 11A is a back isometric view of case 100 with the sockets extended, so that belt 28 can be inserted under buttons 1 and between accordions 2. FIG. 11B is similar to FIG. 11A, except that sockets 24 have been mostly retracted, to grip belt 28 more tightly and reduce the profile of case 100.

Figure 12B:
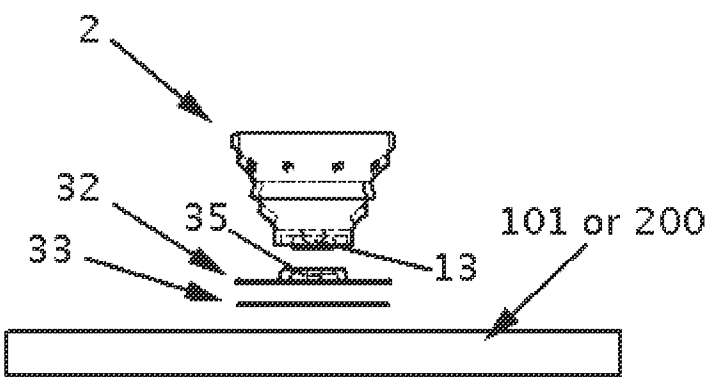
FIG. 12B is an exploded side view of a socket, with a suction-cup tape platform, suction-cup tape, and either a portable media player or a portable media player case according to an embodiment of the present invention wherein the socket attaches to a portable media player or portable media player case by way of suction-cup tape whose surface opposite the suction-cup surface is glued to a semi-rigid platform that snap-fits to one end of the accordion.
Figure 12A:
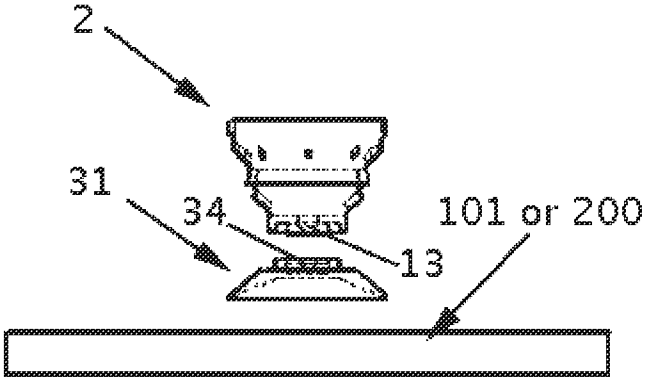
FIG. 12A is an exploded side view of a socket including an accordion and a suction cup, and either a portable media player or a portable media player case according to an embodiment of the present invention wherein the socket attaches to a portable media player or portable media player case by way of a suction cup that is snap-fit to one end of the accordion.

FIG. 12 comprises FIGS. 12A and 12B, and shows socket 24 attaching either to portable media case 101 or to portable media player 200. FIG. 12A is an exploded side view of a socket 24, a suction cup 31, and either a portable media player 200 or a portable media player case 101 according to an embodiment of the present invention wherein the socket attaches to a portable media player 200 or portable media player case 101 by way of a suction cup that is snap-fitted to one end of the socket 24. FIG. 12B is an exploded side view of a socket 24, a suction-cup tape platform 32, suction-cup tape 33, and either a portable media player 200 or a portable media player case 101 according to an embodiment of the present invention wherein the socket 24 attaches to a portable media player 200 or portable media player case 101 by way of suction-cup tape 33 whose surface opposite the suction-cup surface is glued to a platform 32 that is snap-fitted to one end of the socket 24.

While the exemplary preferred embodiments of the present invention are described herein with particularity, those skilled in the art will appreciate various changes, additions, and applications other than those specifically mentioned, which are within the spirit of this invention. For example, media player 200 might be a tablet or an MP3 player or other device such as an iPod Touch™. Case 4 would then be sized accordingly, and the appropriate portholes provided. In addition, more or fewer sockets may be provided. The sockets and buttons may have different shapes and sizes. They might be resilient rather than rigid, or form suction cups.

What is claimed is:

[1. A portable media player case for housing a portable media player, comprising:

a case body for housing the portable media player; and an extendable socket attached to the case body, the socket including:

an accordion forming a tapered shape capable of extending outward from the case body generally along its axis and retracting back toward the case body by collapsing generally along its axis, and a foot disposed at the distal end of the accordion.]

[2. The case of claim 1 wherein the accordion comprises rigid walls interspersed with flexural hinges.]

[3. The case of claim 2 wherein the tapered shape comprises a cone shape constructed and arranged such that the walls fold generally parallel to the axis of the accordion when the accordion is collapsed.]

[4. The case of claim 3 wherein the accordion is formed of polyester-based thermoplastic polyurethane elastomer, the walls are about 1 to 2 mm thick and 2 to 4 mm long, and the flexural hinges are about 0.2 to 0.4 mm thick and 1 to 2 mm long.]

[5. The case of claim 3 wherein the case body forms a cavity for housing the socket when the accordion is retracted.]

[6. The case of claim 1 further comprising a button attached to the foot, the button formed of a rigid material and extending radially past the foot.]

[7. The case of claim 1 further comprising a suction cup attached to the foot.]

[8. The case of claim 1 wherein the foot comprises a suction cup.]

[9. A socket for attaching to a portable media player or to a portable media player case, comprising:

a securing element for attaching the socket to the back of the portable media player or portable media player case; and an accordion forming a tapered shape connected to the securing element, the accordion capable of extending outward generally along its axis from the portable media player and retracting back toward the portable media player by collapsing generally along its axis; and a foot disposed at the distal end of the accordion.]

[10. The socket of claim 9 wherein the accordion comprises rigid walls interspersed with flexural hinges.]

[11. The socket of claim 10 wherein the tapered shape comprises a cone shape constructed and arranged such that the walls fold generally parallel to the axis of the accordion when the accordion is collapsed.]

[12. The socket of claim 11 wherein the accordion is formed of polyester-based thermoplastic polyurethane elastomer, the walls are about 1 to 2 mm thick and 2 to 4 mm long, and the flexural hinges are about 0.2 to 0.4 mm thick and 1 to 2 mm long.]

[13. The socket of claim 12 further comprising a button attached to the foot, the button formed of a rigid material and extending radially past the foot.]

[14. The socket of claim 9 wherein the securing element comprises a suction cup.]

[15. The socket of claim 9 wherein the securing element comprises suction-cup tape.]

[16. A method comprising the steps of:

attaching a socket including an accordion forming a tapered shape and having walls interspaced with flexural hinges to a portable media player;

selectively extending the socket by unfolding the accordion generally along its axis; and selectively retracting the socket by folding the accordion generally along its axis such that the walls fold next to each other.]

[17. The method of claim 16 wherein the retracting step folds the walls into an orientation such that the walls are generally parallel to the axis of the accordion.]

[18. The method of claim 16, wherein the step of attaching the socket comprises the step of enclosing the player in a case already having the socket attached to the case.]

[19. The method of claim 16 wherein the step of attaching the socket attaches two sockets to the player.]

[20. The method of claim 19 wherein the step of extending the socket extends both of the sockets and the step of retracting the socket retracts both of the sockets and further including the step of winding a cord around the accordions after extending the sockets and before retracting the sockets.]

[21. The method of claim 19 wherein the step of extending the socket extends both of the sockets and further includes the step of bending the sockets in a curve away from the original axes of the accordions.]

[22. An extending socket for attaching to a portable media player, the socket forming a tapered shape and further comprising:

means for attaching the socket including an accordion forming a tapered shape to the back of the portable media player;

means for extending the socket outward generally along its axis from the portable media player and retracting the socket back toward the portable media player by collapsing the socket generally along its axis; and a foot disposed at the distal end of the extending and retracting means.]

*23. A portable media player case for housing a portable media player, comprising:*

*a case body for housing the portable media player; and*

*an extendable socket attached to the case body, the socket including:*

*an accordion forming a tapered shape capable of extending outward from the case body generally along its axis and retracting back toward the case body by collapsing generally along its axis, the accordion maintaining pleated folds when fully extended and having walls folding in a generally parallel configuration next to one another, rather than stacking on top of one another, when fully collapsed, wherein the walls are interspersed with flexural hinges, and wherein the walls are about 1 to 2 mm thick and 2 to 4 mm long, and the flexural hinges are about 0.2 to 0.4 mm thick and 1 to 2 mm long; and*

*a foot disposed at the distal end of the accordion.*

*24. The case of claim 23 wherein the tapered shape comprises a cone shape with circular base, constructed and arranged such that the walls fold generally parallel to the axis of the accordion when the accordion is collapsed.*

*25. The case of claim 23 wherein the accordion is formed of polyester-based thermoplastic polyurethane elastomer.*

*26. The case of claim 23 wherein the case body forms a cavity for housing the socket when the accordion is retracted.*

*27. The case of claim 23 further comprising a button attached to the foot, the button formed of a rigid material and extending radially past the foot.*

*28. The case of claim 23 further comprising a suction cup attached to the foot.*

*29. The case of claim 23 wherein the foot comprises a suction cup.*

*30. A socket for attaching to a portable media player or to a portable media player case, comprising:*

*a securing element configured to attach the socket to the back of the portable media player or portable media player case; and*

*an accordion forming a tapered shape connected to the securing element, the accordion capable of extending outward generally along its axis from the portable media player and retracting back toward the portable media player by collapsing generally along its axis, the accordion maintaining pleated folds when fully extended and having walls folding in a generally parallel configuration next to one another, rather than stacking on top of one another, when fully collapsed, wherein the walls are interspersed with flexural hinges, and wherein the walls are about 1 to 2 mm thick and 2 to 4 mm long, and the flexural hinges are about 0.2 to 0.4 mm thick and 1 to 2 mm long; and*

*a foot disposed at the distal end of the accordion.*

*31. The socket of claim 30 wherein the tapered shape comprises a cone shape with circular base, constructed and arranged such that the walls fold generally parallel to the axis of the accordion when the accordion is collapsed.*

*32. The socket of claim 30 wherein the accordion is formed of polyester-based thermoplastic polyurethane elastomer.*

*33. The socket of claim 30 further comprising a button attached to the foot, the button formed of a rigid material and extending radially past the foot.*

*34. The socket of claim 30 wherein the securing element comprises a suction cup.*

*35. The socket of claim 30 wherein the securing element comprises suction-cup tape.*

*36. An extending socket for attaching to a portable media player, the socket forming a tapered shape and further comprising:*

*means for attaching the socket including an accordion forming a tapered shape to the back of the portable media player;*

*means for extending the socket outward generally along its axis from the portable media player and retracting the socket back toward the portable media player by collapsing the socket generally along its axis, the accordion maintaining pleated folds when fully extended and having walls folding next to one another when fully collapsed, wherein the walls are interspersed with flexural hinges, and wherein the walls are about 1 to 2 mm thick and 2 to 4 mm long, and the flexural hinges are about 0.2 to 0.4 mm thick and 1 to 2 mm long; and*

*a foot disposed at the distal end of the extending and retracting means.*

* * * * *